INVENTORS
REINHARD STRAUMANN
KURT KARPF

United States Patent Office 3,041,058
Patented June 26, 1962

3,041,058
HEAT TREATMENT APPARATUS
Reinhard Straumann, Waldenburg, Basel-Compagne, and Kurt Karpf, Holderbank, Switzerland, assignors to Institut Dr. Ing. Reinhard Straumann A.G., Waldenburg, Switzerland, a body corporate of Switzerland
Filed Nov. 9, 1959, Ser. No. 851,623
Claims priority, application Switzerland Nov. 19, 1958
4 Claims. (Cl. 266—5)

The present invention concerns a high vacuum heat treatment apparatus comprising a vacuum pump, an evacuable receptacle for the articles to be heat-treated, and a heating unit for heating the receptacle in accordance with a predetermined program.

It is an object of the present invention to provide an automatically controlled apparatus which will ensure the establishment and maintenance of the desired sequence of operations and values of temperature and pressure in the receptacle during the heat treatment and cooling periods for the articles.

Another object of the invention is to provide a vacuum heat treatment apparatus whereby the articles may be charged into a receptacle before treatment, and removed therefrom after treatment, at room temperature and pressure whilst ensuring that no heat is supplied thereto at treatment temperature until the required degree of vacuum has been established within the receptacle and that a predetermined cooling period must elapse before the receptacle is restored to atmospheric pressure.

A further object of the invention is to provide for the rapid application to the articles of heat at the treatment temperature and its maintenance at a substantially constant value during the heating period, and also for the rapid removal of the heat at the end of a heating period prior to the subsequent cooling period.

A still further object is to provide a heater unit which is displaceable relatively to the receptacle between operative or heating and inoperative or waiting limit positions, the heater unit being constituted by a furnace chamber adapted to embrace the receptacle in its operative position.

A still further object of the invention is to provide automatic program control means for governing each complete heat treatment and cooling cycle, the said control means including means for exhausting the receptacle down to a predetermined low pressure at which heat treatment is to be carried out whilst at the same time preheating the relatively displaceable heater unit to a waiting temperature in excess of that required during the heat treatment period; means for displacing the heater unit to the operative postiion only after the predetermined low pressure has been established within the receptacle, and for maintaining the heater unit temperature substantially constant at the lower value required for the heating period; means for returning the heater unit to its inoperative position at the end of the heating period and for maintaining it at its waiting temperature pending the commencement of the next cycle while the receptacle is maintained at the predetermined low pressure during th cooling period; and means for restoring the internal pressure in the receptacle at the end of a cooling period.

Further objects of the invention include the provision of a pressurestat or gauge responsive to the internal pressure in the receptacle for governing the displacement of the heater unit to its operative position; heating and waiting period thermostats; and a trip switch adapted to be actuated by the heater unit at each limit position of its displacement and operative first, as the heater unit is displaced from its inoperative position, to select the heating temperature thermostat; secondly as the heater unit reaches its operative position, to energise the heating period timer; and thirdly as the heater unit returns to its inoperative position to energise the cooling period timer.

A practical embodiment of a high-vacuum heat treatment apparatus according to the invention will now be described, by way of example only, with reference to the accompanying drawings in which.

Figure 1:
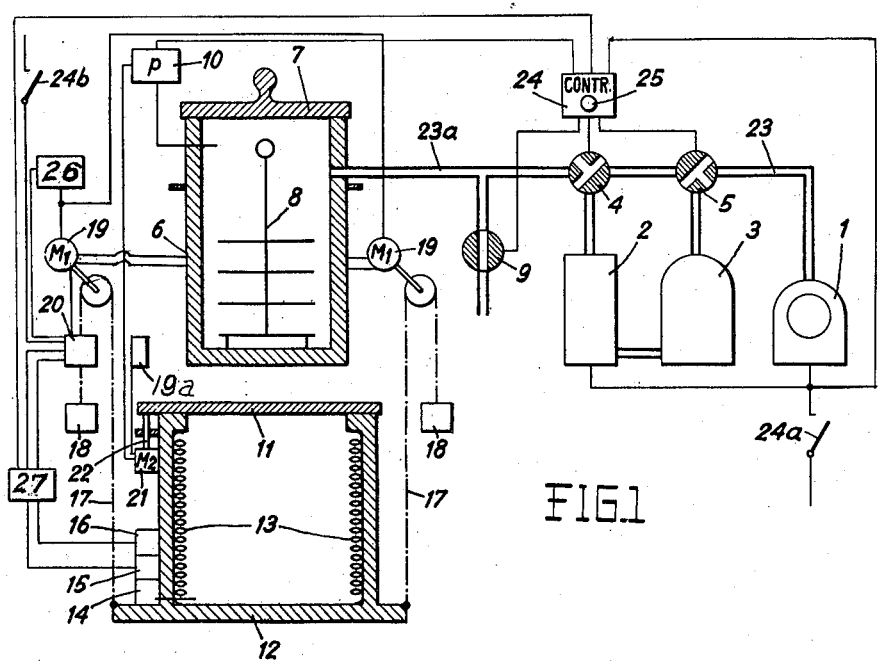
FIGURE 1 is a schematic representation of parts of the apparatus.

The high-vacuum heat treatment apparatus which is schematically shown in FIG. 1 includes evacuation equipment comprising a backing pump 1, a high-vacuum pump 2, and an intermediate vacuum vessel 3. These components are interconnected by pipes 23, and communication between them can be established and interrupted as required by electrically operated valves. In the drawing, these valves are shown in simplified form as three-way cocks 4 and 5. The receptacle for the work to be treated is shown at 6. This receptacle is provided with a tightly closing cover plate 7 and contains trays 8 for supporting the work to be treated. A pipe 23a connects the receptacle 6 with the valve 4 and has a branch provided with an air inlet valve 9. A pressure detector or gauge 10 measures the pressure $p$ inside the receptacle 6 and controls both a motor 21 and a receptacle pressure controller 24 below.

The heating unit consists of a vertically movable furnace pot 12 with a hinged cover or lid 11, the pot containing electrical resistance elements 13. The temperature inside the furnace pot is measured by means of a remote-reading thermometer 14, and is maintained at a constant level $T_1$ or $T_2$ by respective adjustable thermostats 15 and 16. The complete heating unit 11, 12 and 13 is suspended from chains 17 and balanced by counterweights 18. In the illustrated embodiment, the furnace pot 12 can be raised and lowered by means of two electric motors 19. A displacement or trip switch 20 is operated by the position of the pot 12 and controls the sequential stages in the treating programme which depend upon the position of the heating unit 11, 12 and 13. A motor 21 controlled by the pressure gauge 10 serves for opening and closing the cover 11 with which it is connected by means of a shaft 22.

A receptacle pressure controller 24 operates the valves 4, 5 and 9 as required at various stages in each complete cycle of events.

Figure 2:
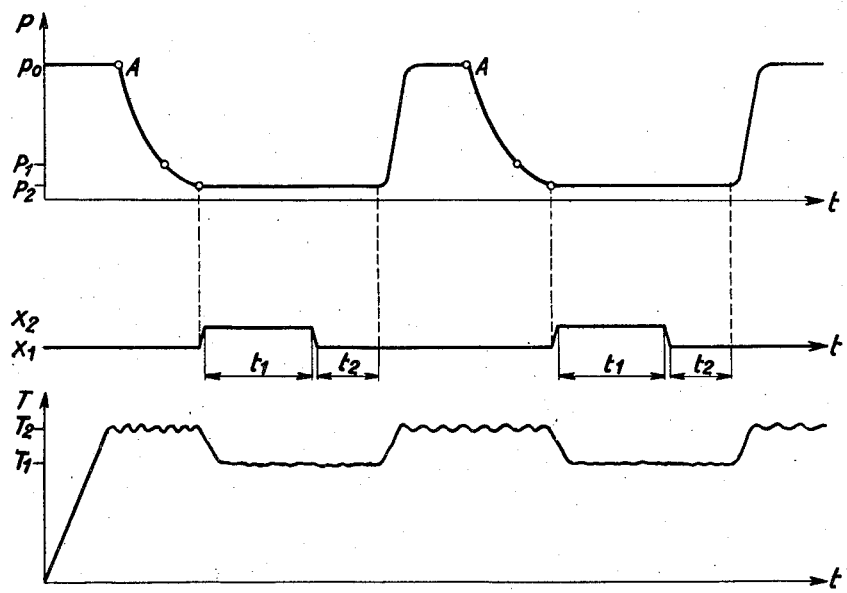
FIGURE 2 is a diagram showing on a common time base, the pressure variations in the receptacle, the furnace temperature, and the positional changes of the heating unit.

Before the apparatus is switched on at a main switch 24a, 24b, the furnace pot 12 with its cover or lid 11 in position, remains in the lowered position, as illustrated in FIG. 1, i.e. in the position represented by $x_1$ in FIG. 2. The valve 9 is open and the pressure inside the receptacle 6 is atmospheric (or ambient) pressure $p_0$. The valves 4 and 5 are fully shut, as shown in FIG. 1, and the thermostat 16 is connected in circuit by the trip switch 20. When the main switch 24a, 24b is closed the heating element 13 preheats the pot 12, under the control of the thermostat 16, to a pre-determined waiting temperature $T_2$ (see FIG. 2). At the same time, the main vacuum pump 2 and the backing pump 1 will both start up, and the receptacle pressure controller 24 changes the positions of the valves 4, 5, 9 to those shown in FIG. 1a, in which the backing pump 1 produces an intermediate vacuum in the vessel 3.

The work which is to be treated is now placed on the trays 8 in the receptacle 6, and the latter is closed by its air-tight cover plate 7. When this has been done, the programme starter switch 25 can be operated and a cycle of the treating programme set in motion. In this cycle, the valve 9 is first closed by the controller 24 (FIG. 1b), and then the receptacle 6 is placed in communication with the intermediate vacuum vessel 3 and the backing pump 1 through the valves 4 and 5 (FIG. 1c). Consequently, the pressure p in the receptacle 6 will begin to drop (point A in FIG. 2) until it reaches a level $p_1$, at which the pressure detector or gauge 10 energises the controller 24 to move the valves 4 and 5 to the positions shown in FIG. 1d in which the high vacuum pump 2 is connected to the receptacle 6. When the pressure in the receptacle 6 has been reduced to the predetermined level $p_2$ (FIG. 2), the motor 21 is switched on under the control of the pressure gauge 10, and the cover 11 of the furnace pot 12 is raised.

As soon as this cover is fully open, a conventional limit switch 19a stops the motor 21 and simultaneously starts up the two motors 19 which lift the furnace pot 12. As soon as the pot 12 rises, the displacement or trip switch 20 is operated to disconnect the thermostat 16 from the heater circuit and connect the thermostat 15 in its stead. This latter thermostat maintains the treating temperature at a predetermined level $T_1$ which is lower than the waiting temperature $T_2$ (FIG. 2). Moreover, as soon as the furnace has reached its uppermost position, the trip switch 20 is again operated to stop the motors 19 and to energise a time relay 26 which controls the duration $t_1$ of the heat treatment. When this time $t_1$—to which the relay 26 can be preset—has expired, the relay re-energises the motors 19 and the furnace 12 is lowered again. Its cover 11 is replaced as soon as it has returned to its lower position $x_1$. At the same time, the trip switch 20 is tripped by the pot 12 and energises another time delay relay 27 which controls the cooling time $t_2$ (FIG. 2). The cooling stage in the receptacle 6 now begins.

When the cooling time has elapsed, the relay 27 changes back the thermostat connections in the circuit of the heater 13, reinstating the waiting time thermostat 16 in place of the heat treatment thermostat 15. The relay 27 also operates the pressure controller 24 to turn valve 4 to disconnect the high vacuum pump 2 from the receptacle 6 at the valve 4 as shown in FIG. 1e. The controller 24 then opens the air inlet valve 9, as shown in FIG. 1f so that the pressure in receptacle 6 will return to atmospheric or ambient pressure $p_0$ (FIG. 2). The cover plate 7 can be re-opened for removal of the treated work and its replacement by fresh work on the trays. The treatment cycle can be resumed, repeating itself as from point A in FIG. 2. The sequence of events in the programme may thus be tabulated as follows.

Figure 1A:
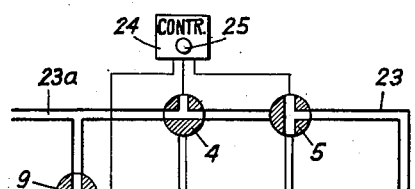
FIGURES 1a to 1f show the sequential positions of the valves during the operational programme.
Figure 1B:
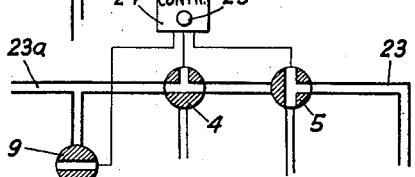
Figure 1C:
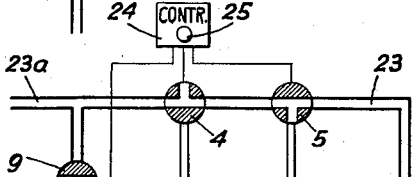
Figure 1D:
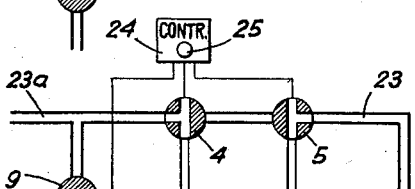
Figure 1E:
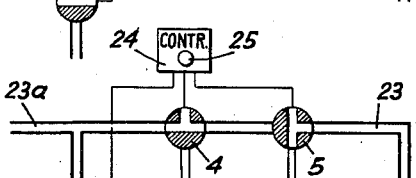
Figure 1F:
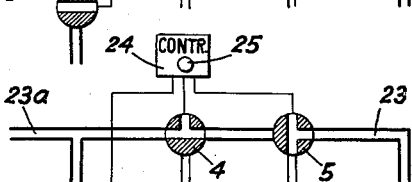

Programme (I)   Close 24a and 24b
  (i) Pumps 1 and 2 started and heater 13 energised
  (ii) Controller 24 changes valves 4 and 5 to FIG. 1a
  (iii) Switch 20 selects thermostat 16
(II)   Operate 25 to start treatment cycle
  (iv) Controller 24 changes valve 9 to FIG. 1b
  (v) Controller 24 changes valve 5 to FIG. 1c
(III)   Pressure in receptacle 6 falls to $p_1$
  (vi) Controller 24 changes valves 4 and 5 to FIG. 1d
(IV)   Pressure in receptacle 6 falls to $p_2$
  (vii) Gauge 10 starts motor 21 to open heater lid 11
  (viii) Heater lid 11 trips limit switch 19a to start motor 19
  (ix) Motor 19 raises heater unit 12 to operate switch 20
  (x) Switch 20 changes thermostat 16 to 15
(V)   Heater unit 12 rises to $x_2$
  (xi) Heater unit 12 trips switch 20
  (xii) Switch 20 stops motor 19 and starts treatment timer 26
(VI)   After treatment period $t_1$
  (xiii) Timer 26 restarts motor 19 to lower heater unit 12
(VII)   Heater unit 12 descends to $x_1$
  (xiv) Switch 20 starts cooling timer 27
(VIII)   After cooling period $t_2$
  (xv) Timer 27 changes thermostat 15 to 16
  (xvi) Timer 27 trips controller 24
  (xvii) Controller 24 changes valve 4 to FIG. 1e
  (xviii) Controller 24 changes the valve 9 to FIG. 1f (=FIG. 1a)
(IX)   Pressure in receptacle 6 rises to $p_0$
(End of treatment cycle)

It will be readily understood that in detail the apparatus could be modified. More particularly the disposition of the pumps 1, 2 and the design of the valves 4, 5, 9 could be altered without affecting the principle which underlies the invention. Moreover, a plurality of time relays such as 26, 27, set to different times could be employed and controlled by selector switches for selecting the appropriate relay applicable to the nature of the work to be treated.

From the foregoing it will be apparent that a desired programme of events in a high vacuum heat treatment apparatus is carried out automatically by means of the automatic control devices 10, 15, 16, 20, 24, 26 and 27, and including the limit switch 19a actuated by the furnace lid 11, these devices together constituting a programme controller which ensures the necessary interrelation of the operations and conditions of temperature and pressure within the receptacle 6. The controller 24 is preferably constituted by relays.

What we claim is:

1. Apparatus for the heat treatment of articles under vacuum, comprising a carrier for the articles, a gas tight receptacle for said carrier, a vacuum pump, valve means connecting the interior of said receptacle alternately to said vacuum pump and the atmosphere, a heater for heating said receptacle and being heatable to either of two temperatures and normally actuated to be heated to the higher of the two temperatures, and program control means comprising a pressure responsive element exposed to the pressure in said receptacle, a valve operating mechanism connected to said valve means for regulating said valve means, said pressure responsive element being connected to said valve operating mechanism, actuating means connected to said heater and to said pressure responsive means for actuating said heater for heating said receptacle at the lower of the two temperatures only after a predetermined low pressure has been reached within said receptacle, a first timer connected to said heater and actuating means for determining the period of heating of said receptacle at the lower of the two temperatures, and a second timer connected to said heater and said actuating means for shutting said heater off for a period of cooling of said receptacle, said second timer being connected to said valve operating mechanism for operating said valve means for causing the restoration of atmospheric pressure in said receptacle at the end of said cooling period.

2. Apparatus for the heat treatment of articles under vacuum, comprising a carrier for the articles, a gas tight receptacle for said carrier, a vacuum pump, valve means connecting the interior of said receptacle alternately to said vacuum pump and the atmosphere, a heater unit displaceable into and out of a receptacle heating position, a motor connected to said heater unit for displacing said heater unit, said heater unit being heatable to either of two temperatures and in the receptacle heating position being heated to the lower of the two temperatures, and program control means comprising a trip switch operable by said heater unit in either limit position of its displacement, a pressure responsive element exposed to the pressure in said receptacle, a valve operating mechanism connected to said valve means for regulating said valve means, said pressure responsive element being connected to said valve operating means and being connected to said motor for operating said motor only after a predetermined low pressure has been reached within said receptacle, a first timer connected between said limit switch and said motor and said limit switch being connected to said heater for actuating said heater to the lower of said two temperatures, the actuation of said limit switch starting said timer and stopping said motor, and a second timer connected between said heater and said limit switch for shutting off said heater unit for a cooling period when said first timer ends its timing period and said motor is actuated to move said heater unit, said second timer being connected to said valve operating mechanism for operating said valve means for causing the restoration of atmospheric pressure in said receptacle at the end of said cooling period.

3. Apparatus for the heat treatment of articles under vacuum, comprising a carrier for the articles, a gas tight receptacle for said carrier, a vacuum pump, a valve means connecting the interior of said receptacle alternately to said vacuum pump and the atmosphere, a hollow furnace of a size to surround said receptacle and displaceable toward and away from a heating position where it surrounds said receptacle, a first thermostat for maintaining said furnace at a predetermined receptacle heating temperature, a second thermostat for normally maintaining said furnace at a higher waiting temperature, a motor connected to said furnace for displacing it, and program control means comprising a trip switch operable by said furnace in either limit position of its displacement, a pressure responsive element exposed to the pressure in said receptacle, a valve operating mechanism connected to said valve means for regulating said valve means, said pressure responsive element being connected to said valve operating means and being connected to said motor for operating said motor only after a predetermined low pressure has been reached within said receptacle, a first timer connected between said limit switch and said motor, and said limit switch being coupled to said thermostats, the actuation of said limit switch starting said timer and stopping said motor and switchng said furnace from the second to the first thermostat, a second timer connected to said limit switch and connected to said thermostats, the connection between said first timer, said limit switch and said second timer causing said motor to be energized at the end of the timed run of the first timer to remove said furnace and causing said second timer to time a cooling period beginning after said limit switch has shut off the motor, and said second timer is caused to switch said furnace from the first to said second thermostat when said second timer ends its timed run, said second timer being connected to said valve operating mechanism for operating said valve means for causing the restoration of atmospheric pressure in said receptacle at the end of said cooling period.

4. An apparatus as claimed in claim 3 in which said furnace has a gas tight cover, and a further motor for said cover, and a further limit switch actuated by said cover and connected between said motor and said further motor, said further motor being connected to said pressure responsive element, said pressure responsive element actuating said further motor when said pressure in the receptacle reaches said predetermined low pressure, and said further limit switch shuts off said further motor and actuates said motor when said cover is fully opened.

References Cited in the file of this patent

UNITED STATES PATENTS

| 1,689,369 | Tama | Oct. 30, 1928 |
| 1,994,629 | Arkema | Mar. 19, 1935 |
| 2,282,226 | Hoop | May 5, 1942 |
| 2,684,392 | Moore | July 20, 1954 |
| 2,855,193 | Gilbert | Oct. 7, 1958 |
| 2,961,305 | Dash | Nov. 27, 1960 |

FOREIGN PATENTS

| 806,618 | Great Britain | Dec. 31, 1958 |
| 810,030 | Great Britain | Mar. 11, 1959 |
| 313,426 | Switzerland | May 31, 1956 |

OTHER REFERENCES

Vacuum Metallurgy, by Rointon F. Bunshah, published by Reinhold Publishing Company, New York, 1957, pages 276–286.